United States Patent [19]

Baungarter et al.

[11] Patent Number: 5,046,216
[45] Date of Patent: Sep. 10, 1991

[54] WINDSHIELD WIPER SYSTEM

[75] Inventors: Peter Baungarter, Steinheim; Bruno Egner-Walter, Heilbronn; Hans Prohaska, Bietigheim-Bissingen; Eckhardt Schmid, Brackenheim; Melitta Teutsch, Ludwigsburg, all of Fed. Rep. of Germany

[73] Assignee: SWF Auto-Electric GmbH, Bietigheim-Bissingen, Fed. Rep. of Germany

[21] Appl. No.: 294,633

[22] PCT Filed: Apr. 20, 1988

[86] PCT No.: PCT/EP88/00332
§ 371 Date: Dec. 20, 1988
§ 102(e) Date: Dec. 20, 1988

[87] PCT Pub. No.: WO88/08382
PCT Pub. Date: Nov. 3, 1988

[30] Foreign Application Priority Data

Apr. 29, 1987 [DE] Fed. Rep. of Germany ....... 3714224

[51] Int. Cl.[5] ................................................ B60S 1/24
[52] U.S. Cl. ................................. 15/250.29; 15/250.05; 15/250.24; 15/250.41
[58] Field of Search ........... 15/250.01, 250.02, 250.03, 15/250.04, 250.05, 250.06, 250.07, 250.08, 250.09, 250.24, 250.25, 250.26, 250.29

[56] References Cited

U.S. PATENT DOCUMENTS

| | | | |
|---|---|---|---|
| 1,490,168 | 4/1924 | Ford et al. | 15/250.05 |
| 1,506,004 | 8/1924 | Noonan | 15/250.29 |
| 1,644,545 | 10/1927 | Robertson | 15/250.26 |
| 1,672,136 | 5/1927 | Scott . | |
| 1,828,410 | 10/1931 | Hardman | 15/250.29 |
| 1,841,734 | 1/1932 | Hueber | 15/250.29 |
| 1,871,987 | 8/1932 | Hardman | 15/250.29 |
| 2,253,029 | 8/1941 | Hart | 15/250.29 |
| 2,785,429 | 3/1957 | Walters | 15/250.26 |
| 3,623,182 | 11/1971 | Parker | 15/250.29 |

FOREIGN PATENT DOCUMENTS

| | | | |
|---|---|---|---|
| 947532 | 7/1956 | Fed. Rep. of Germany | 15/250.29 |
| 1093236 | 11/1960 | Fed. Rep. of Germany | 15/250.29 |
| 184461 | 5/1955 | United Kingdom . | |
| 887114 | 1/1962 | United Kingdom . | |

Primary Examiner—Harvey C. Hornsby
Assistant Examiner—Gary K. Graham
Attorney, Agent, or Firm—Robert P. Seitter; J. Gordon Lewis

[57] ABSTRACT

This invention describes a windshield wiper system comprising a windshield wiper which may be linearly driven to and fro by means of a driving member extending transversely to the longitudinal direction of the windshield wiper. The driving member is guided in a frame from which projects a carrier for the windshield wiper. In the emergence area of the carrier from the frame there is provided a hollow-cylindrical seal of elastic material, which seal is diametrically penetrated by the carrier. The carrier and the driving member are thus protected against weather influences, because in the seal there is sort of an air cushion. If required the seal can due to its shape without any problem serve as a real heating hose and/or as a discharge hose for condensation water.

25 Claims, 1 Drawing Sheet

WINDSHIELD WIPER SYSTEM

BACKGROUND OF THE INVENTION

This invention relates to a windshield wiper system comprising the features of a driving member guided in a frame and connected with a carrier provided with a seal.

A windshield wiper system of this kind is for example known from the British patent specification 887 114. The windshield wiper system has two rubber strips arranged opposite each other which are riveted onto the frame and serve as a seal, which rubber strips rest against two opposite longitudinal surfaces of the carrier for the windshield wiper by means of self-supporting edges. The carrier has an approximately rectangular cross-section and the said edges rest against two opposite longitudinal lateral edges of the former. This kind of seal does not meet increased demands. At least after a longer service life a wear of the edges of the rubber seal has to be feared. Then ice or snow can penetrate into the frame and impede the movability of the driving member and thus of the windshield wiper.

SUMMARY OF THE INVENTION

It is an object of the present invention to create a windshield wiper system of the initially mentioned kind which ensures a good cleaning of the window pane as long as possible and in addition looks as advantageously as possible.

According to the invention this problem is solved by a windshield wiper system having the features of a driving member cooperating with a carrier provided with a seal. In two different places of the length of this carrier of the said windshield wiper system sealing elements rest against it. In this case the sealing safety is at least twice as good as in the above described windshield wiper system. The seal according to the invention not only makes possible the above described multiple sealing, but entails or makes possible further advantages because it encloses a hollow space. So it has to be assumed that in the hollow space enclosed by the seal and thus in front of the driving member a relative warm climate prevails, when an air cushion is available. Consequently a cold surrounding climate does not have too great an effect on the driving member and thus in cold weather too a reliable driving of the windshield wiper is possible. If the seal serves in addition as a heating hose even greater reliability of immaculate operation of the driving member is insured and thus of the windshield wiper.

Of course it is not necessary that the seal is exactly formed in the manner of a hollow cylinder and the carrier and the seal need not penetrate the carrier exactly diametrically. It has only to be taken care that the carrier does not penetrate the seal very close to its wall, so that there is a hollow space chamber on its both sides which ensures or enables the above mentioned effects.

However also the additional function of the seal to serve as a water discharge popt entails advantages alone or in addition to the heating hose function as stated as additional function above. So for example condensation water coming into existence in the interior of the seal can rapidly flow off due to the hollow-cylindrical shape of the former. If desired this discharge can be accelerated by conducting through it a gaseous medium by conducting through it compressed air. The latter can be carried away by the slip stream, if required.

If the seal is furthermore constructed according to a further advantageous embodiment wherein the hollow cylinder forming the seal is slotted in its circumferential direction, an even better sealing is ensured.

A making of the seal and/or of the guide frame from a noise-suppressing material is especially suitable, if the windshield wiper system is provided for a motor vehicle. Then the driver's attention is not drawn away from what happens in the traffic by unnecessarily loud windshield wiper driving noises.

The noise-suppression of the seal can even be improved wherein the seal with strips has a larger surface and can thus suppress noises better than one without strip(s) of this kind.

By the developments shown in the following both the protection of the driving member against atmospheric influences and also the appearance of the windshield wiper system can be improved.

A connection between seal and guide frame ensures at any time a secure position of the seal.

With regard to the windshield wiper system outlined in a further embodiment an especially reliable guidance of the windshield wiper is ensured. In contrast to a windshield wiper system whose windshield wiper is connected at its lower end with the driving member via a carrier conducted in upward direction from a guide frame, and, due to the emergence position selected there can hardly any water or ice reach the driving member and impede its operation and thus that of the windshield wiper. It is pointed out that for this measure independent protection is claimed, because it can also be advantageously realized in a windshield wiper system which does not include one of the seals described above.

If for a windshield wiper system constructed in this kind nevertheless a seal in the area of the carrier for the lower end of the windshield wiper is desired it is suggested to construct the seal, as known in itself, so that it consists of to opposite strips. A further feature of the invention outlines a simple and reliable fastening possibility for a seal of this kind. By means of a guide frame formed according to a still further feature in addition a noise-suppression is achieved.

The windshield wiper guidance at both ends is a further contribution for increasing the operational reliability of the windshield wiper system.

If in a windshield wiper system with a windshield wiper guidance at both ends the measure is realized, the negative influence of production tolerances of the windshield wiper system parts and/or the window pane on the windshield wiper guidance is eliminated. It is emphasized that for this measure independent protection is claimed as well, because it can also be advantageously realized in a windshield wiper system not having one of the seals described above.

Further advantageous details and constructions of the invention can be seen from the other subclaims and the following drawing showing one embodiment.

BRIEF DESCRIPTION OF THE DRAWINGS

Thereby it is shown in

DETAILED DESCRIPTION

Figure 1:
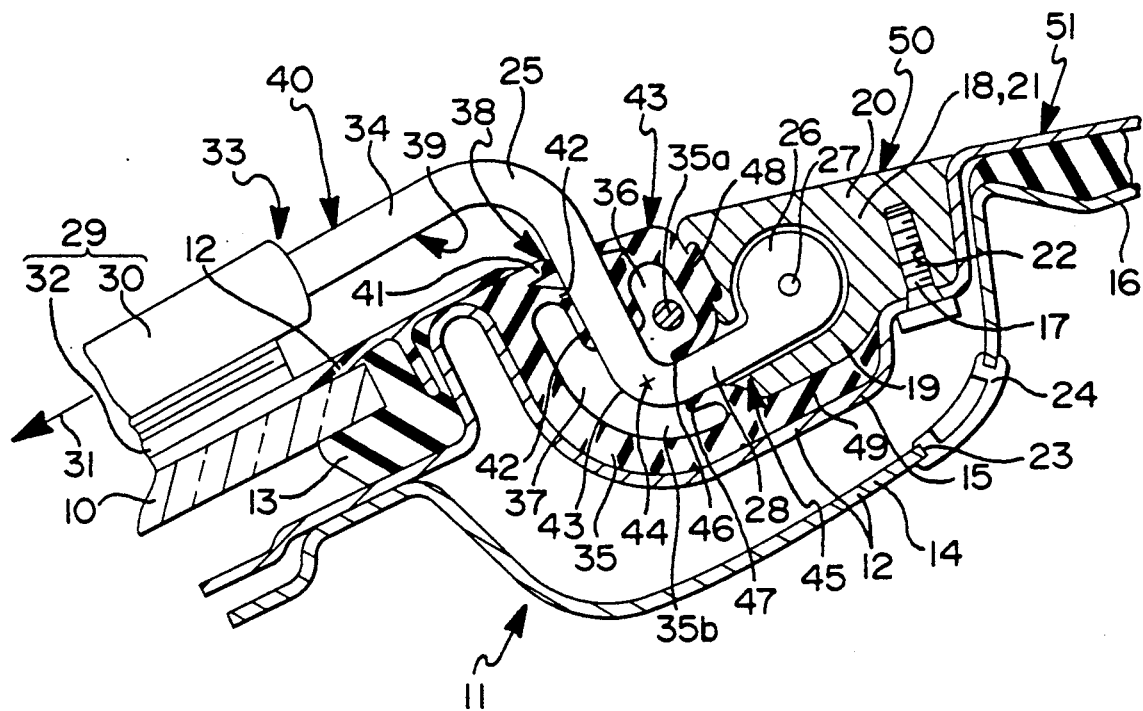
FIG. 1 a cross-section through the upper area of a horizontal wiper system with a windshield wiper guided at both ends and in FIG. 2 the lower area of this wiper system in a cross-sectional view.

The windshield wiper system shown in the Figures of the drawing is constructed as a so-called horizontal wiper system and provided on the windshield 10 of a motor vehicle 11.

Above the windshield 10 to motor vehicle 11 has in the direction of its widths a tub-shaped roof-frame 12 with a substantially U-shaped cross-section, which is open to the outside and has several walls. In the lower area of the roof-frame 12 the windshield 10 is held by means of a pane seal 13 in a conventional manner. In the upper area of the roof-frame 12 its internal wall 14 and its external wall 15 are held with a spacing from each other by means of an insert 16. An approximately U-shaped guide frame 18 which is open in the direction of the pane 10 is held at the outer wall 15 by means of several screws of which one having the reference numeral 17 is shown in FIG. 1. The guide frame has two legs 19 and 20 connected with each other by a curvature 21 which is laid out much thicker than the legs 19 and 20. The screws 17 are screwed into co-axial bores provided in the curvature 21 of the guide frame 18 and in the outer wall 15. The screws 17 are accessible through apertures 23 provided in the interior wall 14 of the roof-frame 12 and closed by means of plugs 24.

Figure 2:
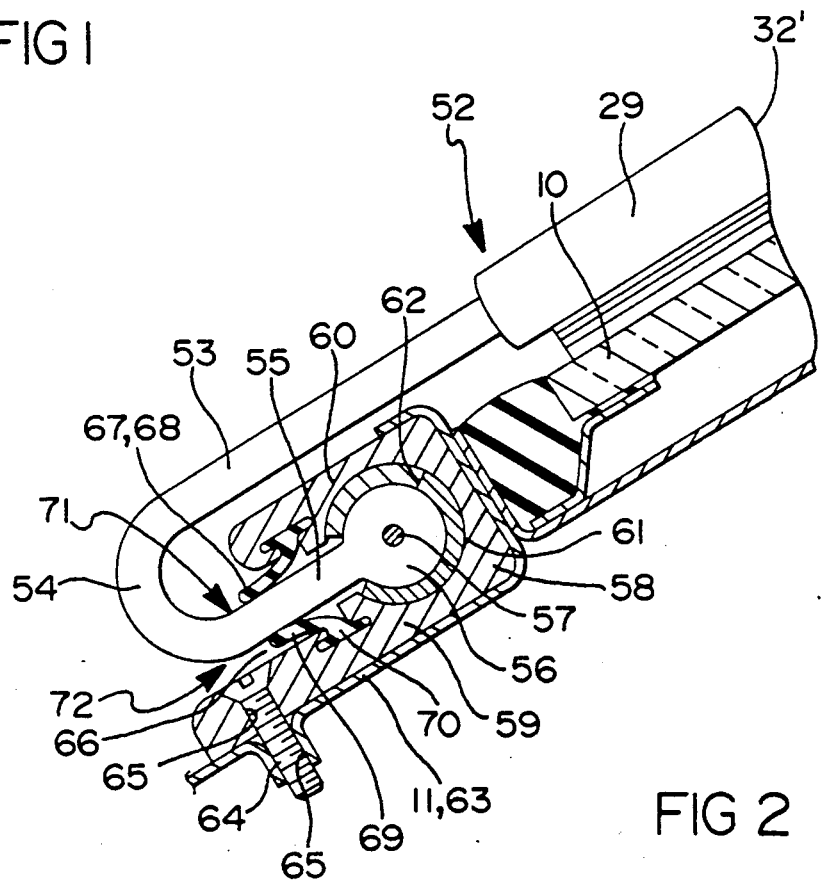

The guide frame 18 serves for guiding a driving member which is not shown in the drawing and may be driven in its longitudinal direction. On the driving member is fastened an approximately Z-shaped carrier 25 by means of its cylindric head 26 whose shaft 27 extends in the direction of the width of the carrier 25 along its Z-leg 28. A windshield wiper 29 can be linearly moved to and fro across the width of the window pane by the driving member via the carrier 25, which windshield wiper has a supporting yoke 30 extending over the height of the window pane and in its longitudinal direction 31 holds two rubber wiper elements extending one beside the other of which one, having the reference numeral 32, is shown und which rest against the window pane 10. The second wiper is illustrated in FIG. 2 as at 32'. In its upper end 33 the windshield wiper 29 is connected with the carrier 25 via a pin connection not shown in the drawing. This pin connection consists of a pin extending in the longitudinal direction 31 of the windshield wiper system on the Z-leg 34 of the carrier also extending in this direction 31 and a pocket hole which is longer than the pin and provided in the supporting yoke 30 of the windshield wiper. The purpose of this pin connection will be illustrated below.

As FIG. 1 furthermore shows there extends a hose-shaped seal 35 approximately formed as a hollow cylinder in the roof-frame 12 below and along the guide frame 18 and thus of the driving member. This seal 35 is filled with air and is thus effective like an air cushion. Moreover, due to the spaced walls 14 and 15 of the roof-frame there is another air cushion. This is why not too great an effect of a surrounding cold climate on the driving member has to be feared and thus a reliable driving of the windshield wiper 29 is possible in cold weather. The carrier 25 substantially projects upwards from the roof-frame 12. It thereby penetrates the seal 35 approximately diametrically. As a matter of fact the seal 35 has on both sides a hollow-space chamber 36 or 37 each in the area which the carrier 25 is occupying on both sides of the longitudinal extension of the latter which substantially corresponds to the longitudinal direction of the windshield wiper. Thus the carrier 25 has a very good thermal protection. It can therefore be expected that a reliable driving of the windshield wiper is possible in weather conditions which are normal in Central European latitudes. For motor vehicles intended to be used in Northern European countries, or as a safety measure, a liquid or gaseous heating medium or heating means 35a can be provided in the sealing 35 or can be conducted through it and/or one or several heating wires or the like can be provided in the seal 35 so that it is also effective as a heating hose. If a stationary liquid or gaseous heating medium is provided the ends of the seal 35 not shown in the drawing have of course to be completely sealed. A circulation system in the seal 35 or through it is reasonable for flowing mediums, because it saves both energy and material. Otherwise it is suggested to close the seal ends by flap valves or the like. Then a streaming heating medium can be conducted through the seal 35 without any problem, if required, and otherwise the above described heat insulation by means of air is provided. In seals 35 of this kind or as well in seals without valves condensation water possible accumulating in the seal 35 can rapidly be removed by means of compressed air which can be derived from the slip stream. Thus the seal 35 can also serve as a water or discharge port 35b. If such a use is intended it is reasonable to provide the ends of the seal in such a position that the water discharge is not effected via the window pane in order to circumvent an avoidable operation of the windshield wiper system.

Independently of the additional function described above the seal 35 seals the carrier 25 excellently because of its hollow-cylindrical shape. In the emergence area 38 of the carrier 25 of the seal 35 the latter is slotted in the circumferential direction of a certain part, so that here it rests against the two longitudinal faces 39 and 40 of the carrier 25 with two lugs 41 and 42 each which are spaced from each other. Thereby the lugs 41 positioned further outside rest against the longitudinal faces 39 and 40 of the carrier 25 by means of their ends. They are shorter than the lugs 42 positioned further inside. These lugs 42 are bent from the outer jacket surface 43 of the seal 35 towards its conceived axis 44 into the interior of the seal and thus rest against the longitudinal faces 39 and 40 of the carrier with a large area and closely. This specific construction of the hollow-cylindrical seal 34 effects an especially reliable sealing.

In the entrance area 45 of the carrier 25 in the seal 35 the sealing is somewhat simpler and is satisfactory, because here the guide frame 18 is positioned above the seal 35. In the entrance area 45 the seal 35 closely rests against the longitudinal faces 39 and 40 of the carrier 25 by means of two unslotted lugs 46 and 47 bent towards the imagined axis 44.

The lugs 41, 42, 46 and 47 extend across the entire length of the seal 35. In the places which not being occupied by the carrier 25 the lugs 42 as well as the lugs 46 and 47 rest against each other in the manner of a spring.

In the upper area of the outer jacket surface 43 of the seal 35 for fixing it on the guide frame 18 there is integrally formed an approximately T-shaped lengthening 48 which extends over the entire length of the seal 35.

The seal 35 is inserted by means of a lengthening 48 into a correspondingly shaped groove having open ends, which groove is worked into the end of the outer leg 20 of the guide frame 18, which is made from a less flexible material than the seal 35 but just as the latter from a noise-suppressing material. Due to the elasticity of the lengthening 48 and guide frame 18 thus a locking connection exists between these parts 48 and 18 and therefore between seal 35 and guide frame 18.

Furthermore in the rear area of the outer jacket surface 43 of the seal 35 a substantially rectangular strip 49 is formed onto the seal 35 which extends across the entire length of the latter. This strip 49 grips behind the interior leg 19 of the guide frame 18. Thus on the whole noises coming into existence when the windshield wiper is operated are considerably suppressed by the seal 35 and the guide frame 18. The driver of the motor vehicle 11 is thus not unnecessarily diverted from what happens in traffic.

Because of the initially described submerged arrangement of windshield wiper system elements in the roof-frame 12 of the motor vehicle the windshield wiper system is also good-looking. A contribution thereto is in particular that both the outer jacket surface 43 of the seal 35 and the outer surface 50 of the guide frame extend in the same plane us the tub edge 51 formed by the roof-frame 12.

As FIG. 2 shows the windshield wiper 29 is fixed by its lower end 52 onto a leg 53 of a carrier 54 which is approximately U-shaped in lateral view. The latter has a cylindric head 56 extending along the other leg 55 of the former, whose shaft 57 extends in the direction of the width of the carrier 54. The windshield wiper 29 is connected with the same driving member via this carrier head 56 as with the other carrier 25. The driving member and the carrier 53 are in this application guided in a guide frame 18 extending in the direction of the width of the motor vehicle 11 and consisting of a noise-suppressing elastic material, which guide frame is constructed similar to the guide frame 18 which has been described above and has two legs 59 and 60 which are interconnected by a curvature 61. The curvature 61 is lined with a slide insert 62. The guide frame 58 is fixed to a body portion 63 of the motor vehicle 11 having a U-shaped cross-section and extending closely below the window pane 10. For this purpose several screws are used of which one having the reference numeral 64 is shown in FIG. 2. The screws 64 are screwed into coaxial bores 65, which are provided in the leg 59 and in the body portion 63. The screws 64 are accessible from outside.

Here it is important that the guide frame 58 is open in downward direction and the carrier 54 therefore projects downwards from the guide frame 58. Because of this emergence position of the carrier in this application can scarcely water or ice be conducted to the driving member and impede the operation of the latter and that of the windshield wiper. For the sake of security there is nevertheless provided a seal 67 in the emergence area 66 of the carrier 54 for the lower end 52 of the windshield wiper 29. However this seal 67 is of simpler construction than the seal 35 described above. It only consists of two strips 68 and 69 arranged opposite each other and made of an elastic material. The strips 68 and 69 are as long as the guide frame 58. They have an approximately T-shaped cross-section. The upper ends 70 of the strips 68 and 69 are fixed in grooves which are worked into the interior sides of the legs 59 and 60 of the guide frame 58. The strips 68 and 69 are pushed into the grooves having open ends in the longitudinal direction. Due to the flexibility of the material of strips 68, 69 and of the guide frame 58 consequently there are existing locking connections between these parts 68 and 58 or 69 and 58. Moreover the strips 68 and 69 rest closely against the longitudinal faces 71 and 72 of the carrier leg 55. In places which are momentarily not occupied by the carrier 54 the strips 68 and 69 resiliently rest against each other. Thus there is ensured an excellent sealing of the carrier 54 and of the driving member against weather influences.

It is particularly reliable to fasten and guide the windshield wiper 29 in both ends 33 and 52. As has been mentioned above the upper end 33 of the windshield wiper 29 and the carrier 25 is provided with a pin connection. The latter makes possible a reciprocal positioning between windshield wiper 29 and carrier 25 when mounted and thus eliminates the negative effect of production tolerances of the windshield wiper system parts 25 and 35 and of the window pane 10.

The two-end guidance of the windshield wiper furthermore ensures that even at high vehicle speeds the latter cannot be lifted off from the window pane 10 undesiredly.

Finally it is emphasized that the windshield wiper system need not necessarily be constructed as a horizontal wiper system. It may just as well be constructed as a perpendicular wiper system. In this case seals ought to be provided on both sides of the window pane 10, which seals are constructed in the same way or in a similar way as the seal 35.

It is furthermore pointed out that the application of the windshield wiper system is not restricted to motor vehicles. It can just as well be used on buildings. Because here a noise suppression is less important than in connection with motor vehicles the guide frame and/or the seal need not necessarily consist of noise-suppressing material.

We claim:

1. A windshield wiper system comprising at least one longitudinally extending windshield wiper which is at least substantially linearly moved to and fro by means of a first driving member extending transversely to the longitudinal direction of the windshield wiper, wherein said first driving member is guided in a first frame and the windshield wiper is at least on one end connected with the said first driving member via a carrier projecting from said first frame and wherein in a first and second emergence area of said first carrier from said first frame there is provided a first seal, characterized in that said first seal (35) is at least substantially formed as a hollow cylinder which is penetrated by said first carrier (25) at least substantially diametrically.

2. A windshield wiper system according to claim 1, characterized in that said first seal (35) forms a discharge port and serves in addition as a water discharge hose.

3. A windshield wiper system according to claim 1, characterized in that said first seal (35) includes heating means and serves in addition as a heating hose.

4. A windshield wiper system according to claim 1, characterized in that in the hollow space (36, 37) enclosed by said first seal (35) there is a gaseous medium.

5. A windshield wiper system according to claim 4, characterized in that the medium has a stationary condition.

6. A windshield wiper system according to claim 4, characterized in that said first seal is structurally positioned so that the medium flows in a predetermined direction.

7. A windshield wiper system according to claim 6, characterized in that the medium is enclosed compressed air.

8. A windshield wiper system according to claim 4 characterized in that means are provided within said first seal (35) for heating the medium.

9. A windshield wiper system according to claim 4 characterized in that means are provided outside said first seal (35) for heating the medium.

10. A windshield wiper system according to claim 1, characterized in that at least in one emergence area (38, 45) of said first carrier (25) said first seal (35) rests against said first carrier (25) by means of lugs (41, 42, 46, 47) bent towards said carriers conceived axis (44).

11. A windshield wiper system according to claim 10, characterized in that the substantially hollow cylinder forming said first seal (35) is slotted in the circumferential direction over a certain part in at least one emergence area (38) of said first carrier (25), so that the said cylinder rests against said first carrier (25) by means of two of said lugs (41, 42) spaced from each other.

12. A windshield wiper system according to claim 1, characterized in that said first seal (35) and said first guide frame (18) consists of noise suppressing material.

13. A windshield wiper system according to claim 12, characterized in that in the longitudinal direction of said first seal (35) includes at least one strip (49) formed on a jacket surface (43), which strip at least partially rests against said first guide frame (18) on a side (20) not facing the windshield wiper (29).

14. A windshield wiper system according to claim 1, characterized in that said first seal (35) and said first guide frame (18) are submergedly inserted in a tub-shaped receiver (12) which is part of an object (11) carrying a window pane (10) to be wiped.

15. A windshield wiper system according to claim 14, characterized in that said first seal (35) and said first guide frame (18) have outer faces (43, 50) positioned at least substantially in the same place as a tub edge (51).

16. A windshield wiper system according to claim 14, characterized in that said first seal (35) and said first guide frame (18) are connected with each other in a locking relationship therebetween.

17. A windshield wiper system according to claim 14, characterized in that a lateral view said first carrier (35) is approximately Z-shaped.

18. A windshield wiper system, according to claim 1, characterized in that it is constructed as a horizontal wiper system with said windshield wiper (29), which at its lower end (52) is connected with a second driving member extending in the longitudinal direction of the windshield wiper by means of a second carrier (54) projecting downwards from a second guide frame (58).

19. A windshield wiper system according to claim 18, characterized in that in a third emergence area (66) of said second carrier (54) for the lower end (52) of the windshield wiper (29) there is provided a second seal consisting of two strips (68, 69) opposite to each other on opposite sides of said second carrier (54).

20. A windshield wiper system according to claim 19, characterized in that said second seal (67) and said second guide frame (58) are interconnected in a locking manner.

21. A windshield wiper system according to claim 20, characterized in that said second guide frame (58) consists of noise-suppressing material.

22. A windshield wiper system according to claim 18, characterized in that in a lateral view said second carrier (54) for the lower end (52) of the windshield wiper (29) is approximately U-shaped.

23. A windshield wiper system, according to claim 1, characterized in that the windshield wiper (29) has a supporting yoke (30) for guiding at least one wiper element (32), which supporting yoke is connected at both of its ends with said first and a second driving member respectively each extending transversely to the longitudinal direction of the windshield wiper and that the supporting yoke (30) is displaceable relative to at least said first carrier (25) in order to adjust the position of each other properly.

24. A windshield wiper system according to claim 23, including a pin and characterized in that at least said first carrier and the windshield wiper are interconnected by said pin extending in the longitudinal direction of the windshield wiper.

25. A windshield wiper system according to claim 1, characterized in that the windshield wiper (29) has two wiper elements (32) extending one beside the other in the longitudinal direction of the former.

* * * * *

UNITED STATES PATENT AND TRADEMARK OFFICE
CERTIFICATE OF CORRECTION

PATENT NO. : 5,046,216

DATED : September 10, 1991

INVENTOR(S) : Peter Baumgarten et al.

It is certified that error appears in the above-identified patent and that said Letters Patent is hereby corrected as shown below:

On the title page, under item [19] and in item [75]:

The first Inventor's last name should read --Baumgarten--.

Signed and Sealed this

Sixteenth Day of March, 1993

Attest:

STEPHEN G. KUNIN

*Attesting Officer*     *Acting Commissioner of Patents and Trademarks*